United States Patent Office 3,799,919
Patented Mar. 26, 1974

3,799,919
SURFACE TREATING COMPOSITIONS
Robert Muir Gibbon, West Kilbride, Scotland, assignor to Imperial Chemical Industries Limited, London, England
No Drawing. Filed Apr. 10, 1972, Ser. No. 242,783
Int. Cl. C08f 19/14
U.S. Cl. 260—18 S    16 Claims

ABSTRACT OF THE DISCLOSURE

Surface treating composition comprising an OH— containing diorganopolysiloxane, a cross-liking agent, an organotin compound and a nitrogen containing compound of the general formula $R^{II}CONR^{III}R^{IV}$ of

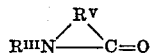

where $R^{II}$, $R^{III}$ and $R^{IV}$ may be, e.g., alkyl groups and $R^{IV}$ is a divalent hydrocarbon group.

---

This invention relates to new and improved surface treating compositions and more particularly to such compositions based on organopolysiloxanes.

A wide variety of compositions based on organopolysiloxanes has been used or proposed for use in treating substrates such as paper, films and papers produced from synthetic materials such as polyolefins, polyesters and other polymers, for example, polyethylene, polypropylene, polyethyleneterephthalate, polyvinyl chloride, polyvinylidene chloride and metal foils such as aluminium and the like in order to confer on these materials non-adhesive or release properties. A number of these compositions have been based on diorganopolysiloxanes containing silicon-bonded hydroxyl groups in conjunction with a linear organopolysiloxane containing silicon-bonded hydrogen atoms or some other crosslinking agent such as, for example, a polysilicate. The actual treating compositions of this type usually contain other constituents which improve the adhesive properties of the coating. The hitherto available compositions while undoubtedly useful, suffer in many cases from the disadvantage that the treating bath has a very short useful life, for example, of only 8 to 9 hours.

According to the present invention a new and improved surface treating composition comprises 100 parts by weight of a linear diorganopolysiloxane having at least two silicon-bonded hydroxyl groups not attached to the same silicon atom, 1 to 20 parts by weight of a crosslinking agent, 1 to 20 parts by weight of an organotin compound, as hereinafter defined, and 1 to 100 parts of a nitrogen-containing compound, as hereinafter defined, if desired in an organic solvent.

A preferred composition comprises 100 parts by weight of the linear diorganopolysiloxane, 2 to 12 parts by weight of the crosslinking agent, 0.5 to 10 parts by weight of the organotin compound and 1 to 50 parts by weight of the nitrogen-containing compound with, if desired, an organic solvent.

The viscosity of the diorganopolysiloxane may vary from 500 cs. at 25° C. upwards. It is, however, preferred in some cases, for example, when maximum ease of release is required, that it be not less than 500,000 cs. at 25° C. If there are present, as there may be, more than 2 hydroxyl groups per molecule, two or more of these may be attached to the same silicon atom always provided that there are at least two hydroxyl groups attached to different silicon atoms. It is also preferred that one of the hydroxyl groups be attached to each terminal silicon atom in the chain.

The diorganopolysiloxane while consisting essentially of diorganosiloxanyl units may also contain a small proportion of trifunctional silicon atoms attached to a single organo group provided the amount of such is not sufficient to destroy the solubility of the diorganopolysiloxane in the chosen organic solvent, if a solvent be used. The organo groups in the diorganopolysiloxane may be alkyl, aryl, aralkyl, alkaryl, alkenyl, cycloalkyl or cycloalkenyl groups or such groups containing a variety of substituents such as halogen or cyano groups. Suitable groups include, for example, methyl, ethyl, phenyl, vinyl, cyclohexyl, 3,3,3-trifluoropropyl and chlorophenyl groups. In many cases it is preferred that at least the major proportion and, in some cases, all of the organo groups be methyl groups.

A wide variety of organic solvent soluble crosslinking agents may be used and the preferred amount will depend on the remaining constituents of the composition and the final properties desired for the treated surface. Included among suitable crosslinking agents are linear organopolysiloxanes containing silicon-bonded hydrogen atoms, silicic acid esters and trialkoxyorganosilanes. The compositions may contain one or more crosslinking agents of the same type or of two or more different types.

When the crosslinking agent is an organohydrogenpolysiloxane it is normally preferably used in amount not less than 3 parts by weight per 100 parts by weight of diorganopolysiloxane. It may be linear or cyclic or contain a proportion of both. The organohydrogenpolysiloxane may, if desired, also contain a proportion, preferably not more than a minor proportion, of diorganosiloxanyl units, but should contain at least one silicon-bonded hydrogen atom for every three silicon atoms. If linear it may be terminated by, for example, triorganosilyl, diorganohydrogensilyl or diorganohydroxysilyl groups. The organo groups in the mono-organohydrogenpolysiloxane may be alkyl, aryl, aralkyl, alkaryl, alkenyl or cycloalkenyl groups. Suitable groups which may be used include, for example, methyl, ethyl, phenyl, tolyl, benzyl and vinyl groups. Preferred siloxanes are those consisting of methylhydrogensiloxanyl units terminated by trimethylsilyl groups.

Silicic acid esters which may be used as crosslinking agents include monomeric and polymeric lower alkyl ester of orthosilicic acid such as the methyl, ethyl, propyl, butyl and amyl esters. The polymeric esters may be prepared in known manner by partial hydrolysis in water of the monomeric esters, Tetraethyl orthosilicate is in many cases preferred.

Trialkoxyorganosilanes suitable for use as crosslinking agents include silanes of the general formula $R^{I}Si(OR)_3$ where $R^{I}$ is an alkyl, preferably lower alkyl or aryl group and R is an alkyl group having not more than 5 carbon atoms. Included among these are, for example, methyltrimethoxysilane and methyltriethoxysilane.

By the phrase "organotin compound soluble in an organic solvent" as used throughout this specification, we mean an organic solvent soluble compound selected from the following classes:

(1) Stannous salts of carboxylic acids.
(2) Diorganotin acylates in which the acyl group is derived from a monovalent acid and is a mononuclear aromatic group or an aliphatic group having not more than twelve carbon atoms and which may or may not contain substituents.
(3) Diorganotin alkoxides.
(4) Diorganotin phenoxides.
(5) Diorganodioximotins.
(6) Dioximopolydiorganostannoxanes.
(7) Diacylpolydiorganostannoxanes.

Mixtures of one or more members of one or more of such classes may be used.

A wide variety of stannous salts of carboxylic acids may be used, it being necessary only that it be soluble in the organic solvent. Suitable salts include, for example, stannous octoate, oleate and stearate and the stannous salt of "Versatic" acid. It is, however, normally preferred to use stannous octoate when this class of tin compound is used.

The organo groups of the diorgano portions of the tin compound may be, for example, alkyl or aryl groups but are preferably alkyl groups. Suitably organo groups include, for example, n-butyl and n-octyl groups.

The acyl groups in the diorganotin acylates may be substituted or unsubstituted groups such as, for example, formyl, acetyl, propionyl, benzoyl, monochloroacetyl, monochlorobenzoyl, phenylacetyl, crotonyl and cinnamoyl groups.

For some purposes it is preferred that the diorganotin compound be a diorganotin acylate and of the acylates dibutyltin diacetate and dioctyltin diacetate are particularly preferred. The acylates may be made, for example, by reacting together a diorganotin oxide such as dibutyltin oxide or dioctyltin oxide with a suitable acid such as acetic acid by heating in an organic solvent such as toluene, the proportion of reactants being such that there are present two carboxyl groups per atom of tin. The water formed during the reaction is removed, for example, by azeotropic distillation and there is thus obtained a solution of the diorganotin acylate. Substituents which may be present in the acyl groups include, for example, halogens such as chlorine and hydrocarbyloxy groups. Suitable diorganotin acylates include, for example, dibutyltin diformate, dibutyltin diacetate, dibutyltin dipropionate, dibutyltin dibenzoate, dibutyltin diphenylacetate, dibutyltin bis (monochloroacetate), dibutyltin dicrotonate, dioctyltin diformate, dioctyltin diacetate, dioctyltin dipropionate, dioctyltin dibenzoate, dioctyltin diphenylacetate, dioctyltin bis(monochloroacetate) and dioctyltin dicrotonate.

The alkoxy groups present in the diorganotin alkoxides preferably contain not more than 10 carbon atoms. Suitable alkoxy groups include, for example, methoxy, ethoxy and n-butoxy groups. Suitable diorganotin alkoxides include, for example, dibutyltin dimethoxide, dioctyltin dimethoxide and dibutyltin dibutoxide.

Phenoxy groups which may be present in the diorganotin phenoxides are in general preferably derived from a monohydric phenol. Suitable phenoxy groups include, for example, phenoxy, 4-chlorophenoxy and 4-methylphenoxy groups. Suitable diorganotin phenoxides include, for example, di-n-butyltin dephenoxide and di-n-octyltin diphenoxide.

The oximo group in the diorganodioximotins may be derived from, for example, benzaldoxime, benzophenoxime, acetophenoxime, acetoxime and acetaldoxime. Suitable diorganodioximotins include, for example, dibutyldibenzaldoximotin, dioctyldibenzophenoximotin and dioctyldibenzaldoximotin. These materials may be prepared by reacting a diorganotin oxide, for example, such as dibutyltin oxide with an aldoxime for ketoxime, for example, such as benzaldoxime, benzophenoxime, acetophenoxime, acetaldoxime or acetoxime, there being used two moles of the oxime per g. atom of tin.

The oximo groups present in the dioximopolydiorganostannoxane may be the same as those present in the diorganodioximotins. The dioximopolydiorganostannoxane may be prepared in a similar manner to that in which the diorganodioximotins are prepared except that there should be used only one mole or less of the oxime per g. atom of tin. The products of the reaction are not necessarily single chemical compounds but may be mixtures of two or more dioximopolydiorganostannoxanes.

The acyl groups in the diacylpolydiorganostannoxanes may be the same as those present in the diorganotin acylates. These products may be prepared in a manner similar to that of the diorganotin acylates except that there should be used amounts of acid such that there is only one carboxylic group per g. atom of tin.

Preferred organotin compounds are dibutyltin diacetate, dioctyltin diacetate, the diacetoxytetra-alkyldistannoxane prepared by reaction of acetic acid with dibutyltin oxide or dioctyltin oxide, the amount of acid being such that there is one mole thereof per g. atom of tin and the dibenzaldoximotetraolkyltin prepared by reaction of dibutyltin oxide or dioctyltin oxide with benzaldoxime using 1 mole of benzaldoxime per g. atom of tin.

By the term "a notrogen-containing compound" as used through this specification we mean an amide of general formula (A) 

or (B) 

wherein $R^{II}$, $R^{III}$ and $^{IV}$, which may or may not be all alike, are hydrogen or a substituted or unsubstituted alkyl, aryl, alkaryl, aralkyl, alkenyl, cycloalkyl or cycloalkenyl groups and preferably contain not more than eight carbon atoms and $R^V$ is a substituted or unsubstituted divalent hydrocarbon group. The groups $R^{II}$, $R^{III}$ and $R^{IV}$ may be, for example, methyl, ethyl, phenyl, benzyl, vinyl, cyclohexyl, cyclohexenyl, trichloropropyl or trifluoropropyl groups. $R^{II}$ is frequently preferred to be hydrogen while $R^{III}$ and $R^{IV}$ are preferred to be alike and further preferred to be methyl groups. Suitable groups $R^V$ include, for example, ethylene, trimethylene, pentamethylene, propenylene, vinylene, and 4-propylpent-2-enylene. It is preferred that it should not contain more than twelve carbon atoms and it is further preferred that it be trimethylene or pentamethylene. When $R^{III}$ and $R^{IV}$ are hydrogen, it is necessary that $R^{II}$ also be hydrogen in order that the nitrogen compound retains its solubility in an organic solvent. Suitable nitrogen compounds include, for example, formamide, N-methylformamide, N,N-dimethyl formamide N-phenylformamide, N-vinyl formamide, N-methyl acetamide, N,N-dimethyl acetamide, N,N-diethylacetamide, N,N-diethyl octoamide and caprolactam. In many cases it is preferred that the nitrogen-containing compound is N,N-dimethyl formamide or N,N-diethyl formamide.

There may, of course, also be incorporated in the compositions of our invention any of the known additives of the various types hitherto added to such compositions. These include, for example, a variety of amines, aminofunctional polysiloxanes, polyamines, and isocyanato compounds.

In general it is preferred that the compositions of our invention contain an organic solvent, although the presence of a solvent is not always necessary. The need for a solvent will frequently be dictated by the viscosity of the diorganopolysiloxane, for example, use of a low viscosity diorganopolysiloxane may render the use of a solvent unnecessary although it may well be desirable in order to get the desired concentrations in the treating bath. Suitable solvents which may be used include aliphatic and aromatic hydrocarbons, ethers and esters, for example, such as toluene, xylene, petroleum fractions, isopropanol and ethyl acetate. Preferred solvents are toluene and hexane. The proportion of solvent in our compositions, if a solvent be used, may vary widely. In general it is preferred that the solvent content should be from 90 to 97 percent by weight of the composition.

Paper or like material may be coated or impregnated with the compositions of our invention by any of the conventional methods for example, knife coating, dipping or spraying. The composition may then be cured by heating at a temperature of from 80° C. to 170° C. for from 2 minutes to 5 seconds.

The compositions of our invention have the advantages over the hitherto available compositions used for the same purposes of having a longer pot life. Our invention also makes it possible to use compositions containing highly active organotin compounds to give more rapid curing at low temperatures than has hitherto been practicable. In hitherto available compositions, such highly active organo-tin compounds would have given impracticably short bath life. Thus, for example, whereas hitherto available compositions have had bath life of the order of 8 to 9 hours our compositions remain useful for periods of the order of from 4 to 5 days and in the case of low temperature curing compositions for example, capable of curing at 70° C. the effective bath life has been increased from a period of 5 to 10 minutes to one of 7 to 8 hours and this without any loss of the desired properties of the final adhesive film. The cure time has been decreased, for example, from 2 minutes to 0.5 minute at 70° C. again without loss of the desired properties of the cured film.

Our invention is further illustrated by the following examples in which all parts and percentages are by weight.

EXAMPLES 1–6

Seven compositions were made up, six according to the invention and one not according to the invention, consisting of the following: 100 parts of toluene solution of 10 parts of a linear hydroxyl-ended dimethylpolysiloxane of viscosity $10^7$ cs. at 25° C., 0.6 part of a linear trimethylsilyl-ended methylhydrogenpolysiloxane of viscosity 20 cs. at 25° C. and Me/Si mole ratio of 1.08:1.0, 1.3 parts of a 50 percent solution in toluene of dibutyltin diacetate and $x$ parts of an amide as shown in Table I below which also shows the effective bath life of each composition.

The effective bath life was taken to be ended when the solution gelled i.e. would no longer flow and therefore a substrate could not be coated therewith.

During the bath life of all seven solutions in tests 1 to 7, the solutions were coated on to vegetable parchment and cured to a hard abrasion resistant film using a heat cure of 120° C. for 2 minutes in a laboratory oven. The cure times necessary were the same in all cases.

TABLE I

| Example | Amide | Parts ($x$) | Effective bath life (hours) |
|---|---|---|---|
|  |  |  | 1 |
| 1 | N,N-dimethylformamide | 2.6 | 24 |
| 2 | do | 4 | 120 |
| 3 | Formamide | 4 | 120 |
| 4 | N,N-dimethylacetamide | 4 | 120 |
| 5 | N-methyl octoamide | 5 | 96 |
| 6 | Caprolactam | 5 | 24 |

EXAMPLES 7–8

Three compositions were made up, two according to the invention and one not according to the invention, consisting of the following: 100 parts of a toluene solution of 10 parts of a linear hydroxyl-ended dimethylpolysiloxane of viscosity 2,000 cs. at 25° C., 0.6 part of the linear trimethylsilyl ended methylhydrogenpolysiloxane used in Examples 1 to 6, 1.3 parts of a 50 percent solution in toluene of dibutyltin diacetate and $x$ parts of an amide as shown in Table II.

TABLE II

| Example | Amide | Parts ($x$) | Effective bath life (hours) |
|---|---|---|---|
|  |  |  | 1 |
| 7 | N,N-dimethylformamide | 2.6 | 4 |
| 8 | do | 4 | 8 |

EXAMPLE 9

Two compositions were made up, one according to the invention and one not according to the invention, consisting of the following: 100 parts of a toluene solution of 10 parts of a linear hydroxyl-ended dimethylpolysiloxane of viscosity $10^7$ cs. at 25° C., 0.6 part of the linear trimethylsilyl-ended methylhydrogenpolysiloxane used in Examples 1 to 6, 0.6 part of tetra-ethyl orthosilicate, 1.3 parts of a 50 percent solution in toluene of dibutyltin diacetate and $x$ parts of an amide as shown in Table III.

TABLE III

| Example | Amide | Parts ($x$) | Effective bath life (hours) |
|---|---|---|---|
|  |  |  | 0.5 |
| 9 | N,N-dimethylformamide | 2.6 | 24 |

Glassine paper was coated with the solutions and thereafter heated at 120° C. for 45 seconds. This gave a hard abrasion-resistant film.

EXAMPLES 10–15

Seven compositions were made up, six according to the invention and one not according to the invention, consisting of the following: 100 parts of a toluene solution of 7.5 parts of a linear hydroxyl-ended dimethylpolysiloxane of viscosity $10^7$ cs. at 25° C., 0.6 part of the linear trimethylsilyl-ended methylhydrogenpolysiloxane used in Examples 1 to 6, 1.25 parts of a 50 percent solution in toluene of a linear trimethylsilyl-ended methyl (N,N-dimethyl aminoethyoxy)polysiloxane of viscosity 20 cs. at 25° C. and Me/aminoethoxy ratio 1.08/1.0, 1.25 parts of a 50 percent solution in toluene of dibutyltin diacetate and $x$ parts of an amide as shown in Table IV.

TABLE IV

| Example | Amide | Parts ($x$) | Effective bath life (hours) |
|---|---|---|---|
|  |  |  | 7–8 |
| 10 | N,N-dimethylformamide | 0.5 | 48 |
| 11 | do | 1.0 | 96 |
| 12 | do | 3.0 | 168 |
| 13 | do | 5.0 | 240 |
| 14 | N,N-dimethylacetamide | 2.0 | 72 |
| 15 | Formamide | 2.0 | 48 |

Glassine paper samples were coated with the solutions and heated at 120° C. for 20 seconds. This gave a hard abrasion-resistant film.

EXAMPLE 16

Two compositions were made up, one according to the invention and one not according to the invention, as in Examples 10 to 15 except that the amount of the 50 percent solution in toluene of dibutyltin diacetate was increased to 2.5 parts and the amount of amide was as shown in Table V.

TABLE V

| Example | Amide | Parts ($x$) | Effective bath life [1] (minutes) |
|---|---|---|---|
|  |  |  | 5 |
| 16 | N,N-dimethylformamide | 2.0 | 360 |

[1] In these cases the effective bath life was taken to be ended when a vegetable parchment paper coated with the solution and given a heat cure at 70° C. of 30 seconds did not give a hard abrasion-resistant film.

EXAMPLE 17

Two compositions were made up, one according to the invention and one not according to the invention, consisting of the following: 100 parts of a toluene solution of 7.5 parts of a linear hydroxyl-ended dimethylpolysiloxane of viscosity $10^7$ cs. at 25° C., 0.6 part of the linear trimethylsilyl-ended methylhydrogenpolysiloxane used in Examples 1 to 6, 0.15 part of $$[CH_3O(CH_2CH_2O)]_4Si$$

0.15 part of

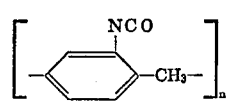

where $n$ had an average value of 6, 1 part of a 50 percent solution in toluene of dibutyltin diacetate, and $x$ parts of an amide as shown in Table VI.

TABLE VI

| Example | Amide | Parts ($x$) | Effective bath life (hours) |
|---|---|---|---|
|  |  |  | 2 |
| 17 | N,N-dimethylformamide | 2 | 24 |

In both cases polythene coated kraft paper was coated with the solutions which were then cured to a hard abrasion resistant film with a heat cure at 120° C. for 30 seconds in an oven.

EXAMPLES 18–19

Three compositions were made up, two according to the invention and one not according to the invention, consisting of the following: 100 parts of a toluene solution of 7.5 parts of a linear hydroxylended dimethylpolysiloxane of viscosity $10^7$ cs. at 25° C., 0.6 part of the linear trimethylsilyl-ended methylhydrogenpolysiloxane used in Examples 1 to 6, 0.1 part of tetraethylene pentamine, 1.25 parts of a 50 percent solution in toluene of dibutylin diacetate and $x$ parts of an amide as shown in Table VII.

TABLE VII

| Example | Amide | Parts ($x$) | Effective bath life (hours) |
|---|---|---|---|
|  |  |  | 24 |
| 18 | N,N-dimethylformamide | 2.0 | 96 |
| 19 | Formamide | 2.0 | 72 |

In all cases the compositions were coated on to glassine paper and gave hard abrasion resistant films when given a heat cure at 120° C. for 15 seconds in an oven.

EXAMPLE 20

Two compositions were made up, one according to the invention and one not according to the invention, consisting of the following: 100 parts of a toluene solution of 7.5 parts of a linear hydroxyl-ended dimethylpolysiloxane of viscosity $10^7$ cs. at 25° C., 0.6 part of the linear trimethylsylyl-ended methylhydrogenpolysiloxane used in Examples 1 to 6, 1.25 parts of a 50 percent solution in toluene of stannous octoate and $x$ parts of an amide as shown in Table VIII.

TABLE VIII

| Example | Amide | Parts ($x$) | Effective bath life (minutes) |
|---|---|---|---|
|  |  |  | 5 |
| 20 | N,N-dimethylformamide | 2 | 120 |

EXAMPLE 21

Two compositions were made up, one according to the invention and one not according to the invention, of the following: 100 parts of a toluene solution of 7.5 parts of a linear hydroxyl-ended dimethylpolysiloxane of viscosity $10^7$ cs. at 25° C., 0.3 part of the linear trimethylsilyl-ended methylhydrogenpolysiloxane used in Examples 1 to 6, 1.25 parts of a 50 percent solution in toluene of tetrabutyl distannoxane diacetate and $x$ parts of an amide as shown in Table IX.

TABLE IX

| Example | Amide | Parts ($x$) | Effective bath life (hours) |
|---|---|---|---|
|  |  |  | 0.75 |
| 21 | N,N-dimethylacetamide | 4 | 72 |

Vegetable parchment paper was coated with the solutions and heated at 120° C. for 45 seconds. This gave hard abrasion-resisting films.

EXAMPLE 22

Two compositions were made up, one according to the invention and one not according to the invention, of the following: 100 parts of a toluene solution of 10 parts of a linear hydroxyl-ended dimethylpolysiloxane of viscosity 8,000 cs. at 25° C., 1.0 part of tetraethylorthosilicate, 1.0 part of stannous octoate and $x$ parts of an amide as shown in Table X.

TABLE X

| Example | Amide | Parts ($x$) | Effective bath life (minutes) |
|---|---|---|---|
|  |  |  | 5 |
| 22 | N,N-dimethylformamide | 3 | 60 |

EXAMPLE 23

Two compositions were made up, one according to the invention and one not according to the invention, of the following: 100 parts of a toluene solution of 10 parts of a linear hydroxyl-ended dimethylpolysiloxane of viscosity $10^7$ cs. at 25° C., 1.0 part of ethyl silicate 40 (a polymeric ethyl ester of ortho silicic acid as sold by Monsanto Ltd.), 2.0 parts of a 50 percent toluene solution of dibutyltin diacetate, and $x$ parts of an amide as shown in Table XI.

TABLE XI

| Example | Amide | Parts ($x$) | Effective bath life (hours) |
|---|---|---|---|
|  |  |  | 24 |
| 23 | N,N-dimethylformamide | 2 | 96 |

EXAMPLES 24–25

Three compositions were made up, two according to the invention and one not according to the invention, of the following: 100 parts of a toluene solution of 10 parts of a linear hydroxyl-ended dimethylpolysiloxane of viscosity of 2,500 cs. at 25° C., 1.0 part of methyltriethoxysilane, 1.0 part of stannous octoate and $x$ parts of an amide as shown in Table XII.

TABLE XII

| Example | Amide | Parts ($x$) | Effective bath life (minutes) |
|---|---|---|---|
|  |  |  | 10 |
| 24 | N,N-dimethylformamide | 3 | 120 |
| 25 | Formamide | 2 | 480 |

EXAMPLE 26

Two compositions were made up, one according to the invention and one not according to the invention, as follows: 100 parts of a toluene solution of 10 parts of a linear hydroxyl-ended dimethylpolysiloxane of 6,000 cs. at 25° C., 1.0 part of tetraethylorthosilicate, 1.5 parts of a 50 percent toluene solultion of dibutyl-dibenzaldoximotin and $x$ parts of an amide is shown in Table XIII.

TABLE XIII

| Example | Amide | Parts ($x$) | Effective bath life (hours) |
|---|---|---|---|
|  |  |  | 16 |
| 2 | N,N-dimethylformamide | 2 | 96 |

EXAMPLE 27

Two compositions were made up, one according to the invention and one not according to the invention, as follows: 100 parts of a toluene solution of 10 parts of a linear hydroxyl-ended dimethylpolysiloxane of 6,000 cs. at 25° C., 1.0 part of tetraethylorthosilicate, 1.5 parts of a 50 percent toluene solution of dibenzaldoximo tetrabutyl distannoxane and $x$ parts of an amide as shown in Table XIV.

TABLE XIV

| Example | Amide | Parts ($x$) | Effective bath life (hours) |
|---|---|---|---|
|  |  |  | 24 |
| 2 | N,N-dimethylacetamide | 2 | 72 |

What I claim is:

1. A surface treating composition comprising 100 parts by weight of a linear diorganopolysiloxane having at least two silicon-bonded hydroxyl groups not attached to the same silicone atom and wherein the organo groups in the diorganopolysiloxane are selected from the group consisting of alkyl, aryl, aralkyl, alkaryl, alkenyl, cycloalkyl and cycloalkenyl groups or such groups substituted by a halogen or cyano group, 1 to 20 parts by weight of a crosslinking agent selected from the group consisting of a linear mono-organohydrogenpolysiloxane wherein the organo groups are selected from alkyl, aryl, aralkyl, alkaryl, alkenyl and cycloalkenyl groups containing at least one silicon-bonded hydrogen atom for every three silicon atoms, silicic acid esters and trialkoxyorganosilanes, 1 to 20 parts by weight of an organotin compound, selected from the group consisting of a stannous salt of a carboxylic acid, a diorganotin acylate in which the acyl group is derived from a monovalent acid and is a mononuclear aromatic group or an aliphatic group having not more than twelve carbon atoms and which may or may not contain substituents, a diorganotin alkoxide, diorganotin phenoxide, diorganodioximotin, dioximopolydiorganostannoxane and diacylpolydiorganostannoxane, and 1 to 100 parts of an amide selected from the group consisting of the general formulae $R^{II}CONR^{III}R^{IV}$ and

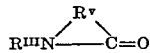

where $R^{II}$, $R^{III}$ and $R^{IV}$ are selected from the group consisting of hydrogen, substituted and unsubstituted alkyl, aryl, alkaryl, aralkyl, alkenyl, cycloalkyl and cycloalkenyl groups and $R^V$ is a substituted or unsubstituted divalent hydrocarbon group.

2. A composition according to claim 1 comprising 100 parts by weight of the linear diorganopolysiloxane, 2 to 12 parts by weight of the crosslinking agent, 0.5 to 10 parts by weight of the organotin compound and 1 to 50 parts by weight of the amide.

3. A composition according to claim 1 wherein the viscosity of the diorganopolysiloxane is not less than 500,000 cs. at 25° C.

4. A composition according to claim 1 wherein the organo groups of the said diorganopolysiloxane are selected from the group consisting of methyl, ethyl, phenyl, vinyl cylohexyl, 3,3,3-trifluoropropyl and chlorophenyl groups.

5. A composition according to claim 4 wherein at least a major proportion of the organo groups are methyl groups.

6. A composition according to claim 1 wherein the crosslinking agent consists of methylhydrogensiloxanyl units terminated by trimethylsilyl groups.

7. A composition according to claim 1 wherein the crosslinking agent is selected from the group consisting of monomeric and polymeric methyl, ethyl, propyl, butyl or amyl esters of silicic acid.

8. A composition according to claim 1 wherein the crosslinking agent is a silane of the general formula $$R^I Si(OR)_3$$

where $R^I$ is selected from the group consisting of alkyl and aryl group and R is an alkyl group having not more than 5 carbon atoms.

9. A composition according to claim 1 wherein the organotin compound is selected from the group consisting of stannous octoate, dibutyltin diacetate, a dioctyltin diacetate, diacetoxytetra-alkyldistannoxane and a dibenzaldoximotetraalkyltin.

10. A composition according to claim 1 wherein the group $R^{II}$ is hydrogen.

11. A composition according to claim 1 wherein the groups $R^{III}$ and $R^{IV}$ are the same.

12. A composition according to claim 11 wherein the groups $R^{III}$ and $R^{IV}$ are methyl groups.

13. A composition according to claim 1 wherein the group $R^V$ contains not more than 12 carbon atoms.

14. A composition according to claim 1 wherein the group $R^V$ is selected from the group consisting of trimethylene and pentamethylene groups.

15. A composition according to claim 1 wherein an organic solvent is present in amount from 90 to 97 percent by weight of the composition.

16. The composition of claim 1 also containing an organic solvent.

References Cited
UNITED STATES PATENTS

| 3,188,299 | 6/1965 | Chalk | 260—46.5 |
| 3,524,900 | 8/1970 | Gibbon et al. | 260—825 |
| 3,527,728 | 9/1970 | Gibbon et al. | 260—825 |
| 3,661,887 | 5/1972 | Leebrick | 260—185 |

DONALD E. CZAJA, Primary Examiner

M. I. MARQUIS, Assistant Examiner

U.S. Cl. X.R.

117—155 R; 260—31.2 R, 32.6 R, 33.6 SB, 46.5 G, 825